(12) United States Patent
Xu et al.

(10) Patent No.: US 8,129,304 B2
(45) Date of Patent: Mar. 6, 2012

(54) INTERMETALLIC COMPOUND $NI_3AL$ CATALYST FOR REFORMING METHANOL AND METHANOL REFORMING METHOD USING SAME

(75) Inventors: Ya Xu, Tsukuba (JP); Kyosuke Kishida, Tsukuba (JP); Masahiko Demura, Tsukuba (JP); Toshiyuki Hirano, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 276 days.

(21) Appl. No.: 10/587,940

(22) PCT Filed: Feb. 2, 2005

(86) PCT No.: PCT/JP2005/001861
§ 371 (c)(1),
(2), (4) Date: Sep. 29, 2006

(87) PCT Pub. No.: WO2005/072865
PCT Pub. Date: Aug. 11, 2005

(65) Prior Publication Data
US 2007/0129242 A1    Jun. 7, 2007

(30) Foreign Application Priority Data

Feb. 2, 2004 (JP) ................................ 2004-025121
Aug. 25, 2004 (JP) ................................ 2004-245546

(51) Int. Cl.
*B01J 23/00* (2006.01)
*C01B 3/32* (2006.01)

(52) U.S. Cl. ...................................... 502/300; 48/198.7
(58) Field of Classification Search ........................ None
See application file for complete search history.

(56) References Cited

U.S. PATENT DOCUMENTS

| 5,090,997 | A | | 2/1992 | Birkenstock et al. |
| 5,330,701 | A | * | 7/1994 | Shaw et al. ..................... 419/10 |
| 5,496,655 | A | * | 3/1996 | Lessing ........................... 429/34 |
| 5,635,439 | A | * | 6/1997 | Fukui et al. ................... 502/328 |
| 6,444,061 | B1 | * | 9/2002 | Hirano et al. ................. 148/556 |
| 2003/0004059 | A1 | | 1/2003 | Haake et al. |
| 2003/0042226 | A1 | * | 3/2003 | Coll et al. ......................... 216/41 |
| 2004/0074571 | A1 | | 4/2004 | Adkins et al. |
| 2008/0014431 | A1 | * | 1/2008 | Lashmore et al. ......... 428/315.5 |

FOREIGN PATENT DOCUMENTS

| JP | 63-209753 | 8/1988 |
| JP | 2-141402 | 5/1990 |

(Continued)

OTHER PUBLICATIONS

Ya Xu et al., "Catalytic Activity of $Ni_3Al$ Intermetallic Compound", The Japan Institute of Metals Koen Gaiyo, Mar. 30, 2004, p. 413.

(Continued)

*Primary Examiner* — Emily Le
*Assistant Examiner* — Sarah A Slifka
(74) *Attorney, Agent, or Firm* — Wenderoth, Lind & Ponack, L.L.P.

(57) ABSTRACT

A methanol-reforming catalyst containing a $Ni_3Al$ intermetallic compound as a main component that is superior in heat resistance and abrasion resistance and has a high activity and selectivity even at a high temperature.

9 Claims, 10 Drawing Sheets

FOREIGN PATENT DOCUMENTS

| | | |
|---|---|---|
| JP | 2-279502 | 11/1990 |
| JP | 4-214807 | 8/1992 |
| JP | 5-116901 | 5/1993 |
| JP | 2003-93879 | 4/2003 |
| JP | 2004-57963 | 2/2004 |

OTHER PUBLICATIONS

Ya Xu et al., "Catalytic Function of $Ni_3Al$ Intermetallic Compound With Respect to Hydrogen Manufacturing Reaction From Methanol" Dai 94 Kai Shokubai Toronkai Toronkai A Yokoshu, Sep. 27, 2004, p. 393.

Ya Xu et al., "Characterization and Catalytic Properties of $Ni_3Al$ for Hydrogen Production from Methanol", Mater. Res. Soc. Symp. Proc., Materials Research Society, vol. 842, pp. S4.2.1-S4.2.6, 2005.

Ya Xu et al., "Catalytic Properties of $Ni_3Al$ Intermetallics for Methanol Decomposition", Materials Transactions, vol. 45, No. 11, pp. 3177-3179, 2004.

Ya Xu et al., "Catalytic properties of alkali-leached $Ni_3Al$ for hydrogen production from methanol", Intermetallics, vol. 13, pp. 151-155, 2005.

* cited by examiner

INTERMETALLIC COMPOUND NI₃AL CATALYST FOR REFORMING METHANOL AND METHANOL REFORMING METHOD USING SAME

TECHNICAL FIELD

The present invention relates to a methanol-reforming catalyst useful in producing hydrogen and a methanol-reforming method using the same.

BACKGROUND ART

Recently, hydrogen, which generates only water in combustion, is attracting attention as a clean energy medium from the viewpoint of preservation of the global environment and more recently as a fuel for fuel cell. Various methods of producing hydrogen as a fuel are known, and one of them is a method of producing hydrogen in a methanol-reforming reaction. Although methanol may be used as it is as a biomass fuel or the like, methanol as a source of hydrogen by reforming is attracting attention from the viewpoint of energy efficiency.

The reaction of producing hydrogen by reforming methanol is endothermic, and, for example in a methanol-reforming gas engine of fuel cell-powered vehicles, exhaust heat is used for raising the temperature of the methanol-reforming reaction for improvement in energy utilization efficiency, and the overall efficiency in such a case is said to be improved by 31-48%, compared to the case where methanol is directly combusted.

However, when the exhaust gas is used actually for the methanol-reforming reaction, a low-cost longer-lifetime catalyst superior in heat resistance, activity, and abrasion resistance is needed, because the temperature of the exhaust gas fluctuates in the range of 200° C. to 700° C. Base metal elements such as copper, chromium and zinc or the oxide thereof have been generally used as the methanol-reforming catalysts, but although active at low temperature in the reforming reaction for producing water vapor from methanol, these conventional catalysts have a problem of low heat resistance. Alternatively, catalysts of a noble metal element (e.g. platinum) or the oxide thereof supported on a carrier such as alumina are also known, but these catalysts have a problem of high cost.

Under the circumstance surrounding the conventional technology described above, the present inventors paid attention to an intermetallic compound $Ni_3Al$ superior in high-temperature properties and abrasion resistance the yield strength of which has a positive dependence on temperature (called reverse temperature dependence of strength) as a methanol-reforming catalyst. The intermetallic compound $Ni_3Al$ has been proposed as a molded catalyst (Japanese Patent Application Laid-Open No. 55-88856), but the potential thereof as a methanol-reforming catalyst at high temperature is not studied and there was no report on such applications.

DISCLOSURE OF INVENTION

An object of the present invention, which was made under the circumstances above, is to provide a new low-cost methanol-reforming catalyst for producing a hydrogen-containing gas from a raw material, methanol or a liquid mixture of methanol and water, which is superior in heat resistance and abrasion resistance and has a high activity and high selectivity even at high temperature, and a new methanol-reforming method using the same.

In order to achieve the above-described object, a first aspect of the present invention provides a methanol-reforming catalyst characterized by containing an intermetallic compound $Ni_3Al$.

In a second aspect, the present invention provides a methanol-reforming catalyst, characterized by containing the intermetallic compound $Ni_3Al$ and coexistent components, wherein the contents of Ni and Al are respectively 77 to 95% and 5 to 23% with respect to the total element composition (wt %) including the coexistent components. In a third aspect, the present invention provides a methanol-reforming catalyst, characterized by being a powder or a granule prepared by machining and mechanically polishing a melt-prepared ingot or in an atomization process. In a fourth aspect, the present invention provides the methanol-reforming catalyst in the first or second aspect, characterized by being a cold-rolled foil prepared by cold-rolling method by using a $Ni_3Al$ alloy prepared by unidirectional solidification method.

In a fifth aspect, the present invention provides a methanol-reforming catalyst, characterized in that carbon nanofibers containing metal fine particles are deposited on the surface of any one of the catalysts described above. In a sixth aspect, the present invention provides a methanol-reforming catalyst, wherein the metal fine particles are fine particles of at least one of the metals of Ni and $Ni_3Al$.

In a seventh aspect, the present invention provides the methanol-reforming catalyst in any one of the aspects above, characterized by being alkali or acid treated.

In an eighth aspect, the present invention provides a methanol-reforming method by using the catalyst in any one of the aspects above, characterized in that hydrogen is produced by bringing methanol or a liquid mixture of methanol and water into contact with the catalyst. In a ninth aspect, the present invention provides a methanol-reforming method, characterized in that methanol or a liquid mixture of methanol and water is brought into contact with a catalyst that is previously subjected to a hydrogen reduction treatment.

BEST MODE FOR CARRYING OUT THE INVENTION

Embodiments of the present invention that is characterized as described above will be described hereinafter.

In the catalyst according to the present invention containing the intermetallic compound $Ni_3Al$ as active component, the compositional ranges of Ni and Al in independent phases are respectively 85 to 88 wt % and 12 to 15 wt %. The catalyst containing the $Ni_3Al$ intermetallic compound may contain additionally other components: for example, NiAl, $Ni_5Al_3$, Ni, and the like. Allowed presence of these components makes preparation and adjustment of the catalyst easier and is also favorable for adjustment of the composition and the shape of catalyst and for activation treatment. When these other components are present, the overall compositional ranges of Ni and Al are preferably 77 to 95 wt % and 15 to 23 wt %, respectively.

Also in the present invention, the intermetallic compound $Ni_3Al$ may be treated with an alkali or acid, for removal of the oxide on the surface of the intermetallic compound $Ni_3Al$ or the like, control of the surface shape and the composition and enhancement of catalytic activity by dissolving Al and Ni. The alkali treatment is generally performed by using an aqueous solution or an organic solvent solution of an inorganic or organic base and at a temperature in the range of room temperature to approximately 100° C. Alternatively, an aqueous solution or an organic solvent solution of an inorganic or organic acid can be used for the acid treatment. The processing temperature is generally considered to be room temperature to approximately 50° C.

In the alkali treatment, only Al is dissolved and Ni remains almost undissolved. For example when an aqueous NaOH solution is used, the concentration of NaOH is preferably 10% or more, more preferably 20 to 30%; the processing temperature, 60-100° C.; and the processing period, 1 hour or more. In the acid treatment, both Al and Ni are dissolved, and care should be given to the treatment, because processing at a higher concentration for an extended period often results in increase in loss of the intermetallic compound $Ni_3Al$. For example, when a HCl solution is used, the concentration is preferably 20% or less; the processing temperature, around 20° C.; and the processing period, 1 hour or less. When a $HNO_3$ solution is used, the concentration is preferably 5% or less; the processing temperature, around 20° C.; and the processing period, 1 hour or less.

The methanol-reforming catalyst according to the present invention can be produced or prepared by various methods. For example, a powder or granule thereof can be produced, for example, by forming the raw metal elements into the shape of ingot and machining the raw ingot and additionally mechanically polishing the powder or granule thus obtained, or in the atomization process from the molten metal. The powder or granule thereof may of course be molded into a desirable shape. The catalyst may also contain ceramics, other metals, and the complexes thereof additionally. Any one of other methanol-reforming catalysts including known catalysts may be used in combination, as long as it does not inhibit the activity of $Ni_3Al$.

When the catalyst according to the present invention described above is used in the shape of powder or granule, the average diameter of the catalyst is, for example, in the range of approximately 150 μm or less and more preferably 32 μm or less. The specific surface areas thereof are, for example, in the range of 2.5 $m^2/g$ or less before the alkali or acid treatment and in the range of 2.5 to 6 $m^2/g$ after treatment.

In addition, the methanol-reforming catalyst according to the present invention may be a cold-rolled foil prepared by cold-rolling method by using a $Ni_3Al$ alloy prepared by unidirectional solidification method. The cold-rolled foil is prepared, for example, according to the method described in Japanese Patent No. 3374173. Specifically, a cold-rolled foil is prepared by preparing a starting rod by arc-melting an alloy having a chemical composition containing Ni as a main component and Al as well, preparing a one-dimensionally-grown crystal rod by growing the starting rod into a columnar crystal by melting solidification, then slicing the one-dimensionally-grown crystal rod into plates, and cold-rolling the plate at room temperature. The plate may be cold-rolled as needed after annealing under a vacuum of higher than $10^{-3}$ Pa at a temperature of 800° C. or more for 20 minutes or more. The thickness of the cold-rolled foil is preferably 500 μm or less from the points of productivity and catalytic activity. The methanol-reforming catalyst thus prepared is superior in high-temperature properties, higher in catalytic activity and selectivity at a temperature of 400° C. or more, and resistant to degradation in the catalytic activity even at high temperature for an extended period of time. The alkali treatment may also be performed to the cold-rolled foil. In such a case, the catalyst exhibits its catalytic activity even at a lower temperature. As a result, the methanol-reforming catalyst plays the roles both as a material for high-temperature chemical reaction containers and a catalyst material, and thus would be applicable as a new smaller, high-efficiency high-temperature reactor.

The highest limit temperature of the methanol-reforming reaction is not particularly limited, but is considered to be generally up to approximately 600° C., from the points of processability, catalytic activity, and others.

In addition, the methanol-reforming catalyst according to the present invention may have a porous structure of carbon nanofibers containing metal fine particles deposited on the surface of the catalyst. The porous structure is formed as the catalytic methanol-reforming reaction progresses at a catalytic reaction temperature of, for example, 400° C. or more, more preferably 400° C. to 580° C. The porous structure may be formed even at a catalytic reaction temperature of lower than 400° C., and the catalyst may be activated in the catalyst activation treatment described below. The reaction period for depositing the porous structure is generally, approximately 1 to 70 hours. The porous structure is effective in providing a higher catalytic activity, and thus, a catalyst having such a structure is effective in improving its catalytic properties drastically. Thus, it is possible to reform methanol more efficiently by forming a porous structure of carbon nanofibers containing metal fine particles previously on the surface of the catalyst, namely by performing a catalyst activation treatment before reforming methanol with the catalyst. The metal fine particles may be fine particles of at least one metal of Ni and $Ni_3Al$. The shape of the metal fine particles may be spherical or undefined, and the particle diameter thereof is 10 nm to 10 μm, preferably 10 nm to 200 nm. A carbon nanofiber, for example, having a diameter of 10 to 200 nm and a length of 100 nm to 1 mm is preferable.

Methanol or a liquid mixture of methanol and water may be used in producing hydrogen in the methanol-reforming reaction by using the catalyst according to the present invention. When methanol and water are used, the ratio of methanol to the catalyst (methanol:water) is generally, for example, approximately 1:0.1 to 5 as a molar ratio at a space velocity (LHSV) in the range of 15 to 35 $h^{-1}$. The reforming reaction may be carried out by a fixed-bed or fluidized bed method.

The reaction temperature is more preferably in the range of 240° C. to 520° C.

Hereinafter, the embodiments of the present invention will be described in more detail with reference to the following Examples, but it should be understood that the present invention is not restricted by the following Examples.

EXAMPLES

Example 1

The following two kinds of $Ni_3Al$ powder samples were prepared:

(a) A $Ni_3Al$ powder sample having a composition of 86.91 wt % Ni and 13.09 wt % Al was prepared in a rotating disk atomization process. The specific surface area of the powder having a particle diameter of 32 μm or less as determined by the BET method was 1.3 $m^2/g$; the specific surface area of the powder having a particle diameter of 32 to 75 μm was 0.4 $m^3/g$; and the specific surface area of the powder having a particle diameter of 75 to 150 μm was 0.1 $m^2/g$.

(b) A $Ni_3Al$ alloy ingot having a composition of 87.32 wt % Ni and 12.67 wt % Al was prepared in a melting furnace. Chips were produced from the ingot by machine work, and these chips were converted to a powder of 150 μm or less in diameter by mechanical polishing. Analysis by the BET method revealed that the specific surface area of the $Ni_3Al$ powder thus prepared was 2.3 $m^2/g$.

Then, the powder thus prepared was treated with the following alkali and acid.

(1) 3 g of the $Ni_3Al$ powder prepared by mechanical polishing was added into 120 g of an aqueous 20% NaOH solution, and the mixture was left at a temperature of 65 to 70° C. for 5 hours while stirred. Then, the aqueous alkaline solution was removed by decantation. The precipitate was washed with distilled water in a suitable amount, and the wash liquid was removed by decantation. The operations were repeated until the wash liquid became neutral. The precipitate obtained was dehydrated. After dehydration, the precipitate was dried at 50° C. overnight, to give a $Ni_3Al$ catalyst. ICP emission spectrochemical analysis revealed that about 14% (weight ratio) of Al in the $Ni_3Al$ catalyst prepared with the aqueous NaOH solution was dissolved and removed. Measurement of the specific surface area by the BET method revealed that the specific surface area of the catalyst thus prepared was 5.1 $m^2/g$.

(2) 1.3 g of the $Ni_3Al$ powder prepared by mechanical polishing was added into 80 g of an aqueous 30% NaOH solution, and the mixture was left at a temperature of 60 to 65° C. for 3.5 hours while stirred. ICP emission spectrochemical analysis revealed that about 10% (weight ratio) of Al in the $Ni_3Al$ catalyst prepared with the aqueous NaOH solution was dissolved and removed. Measurement by the BET method revealed that the specific surface area of the powder thus prepared was 4.3 $m^2/g$.

(3) 3 g of the $Ni_3Al$ powder having a particle diameter of 32 to 75 μm or less prepared in the rotating disk atomization process was added to 120 g of a 20% HCl solution and left at room temperature for 3 hours while stirred. Measurement by the BET method revealed that the specific surface area of the powder prepared was 1.1 $m^2/g$.

(4) 3 g of the $Ni_3Al$ powder having a particle diameter of 32 to 75 μm prepared in the rotating disk atomization process was added to 120 g of a 5% $HNO_3$ solution, and the mixture was left at room temperature for 3 hours while stirred. Measurement by the BET method revealed that the specific surface area of the powder thus prepared was 3.6 $m^2/g$.

The specific surface areas ($m^2/g$) of the powders prepared by the surface treatment as measured by the BET method are summarized in Table 1 (the symbol "-" means no measurement).

TABLE 1

| Sample | Before surface treatment | After 20% NaOH treatment | After 30% NaOH treatment | After 20% HCl treatment | After 5% HNO$_3$ treatment |
|---|---|---|---|---|---|
| Ni$_3$Al (prepared by mechanical polishing) | 2.3 | 5.1 | 4.3 | — | — |
| Ni$_3$Al (prepared in rotating disk atomization process, 32 to 75 μm) | 0.4 | — | — | 1.1 | 3.6 |

The results in Table 1 show that both alkali and acid treatments are effective in increasing the specific surface area of Ni$_3$Al.

Example 2

Figure 1:
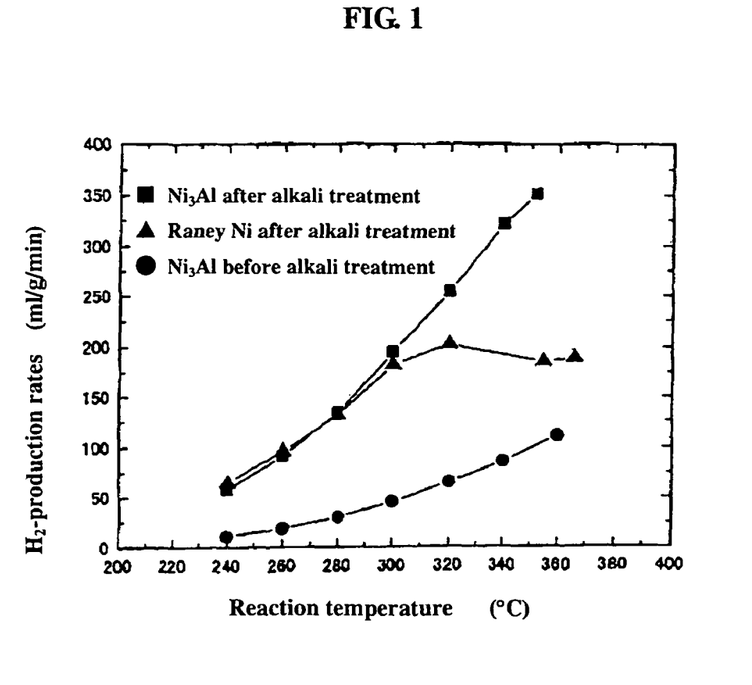
FIG. 1 is a graph showing the $H_2$-production rates (ml/min/g) measured in methanol-reforming reactions by using $Ni_3Al$ and Raney nickel as a function of the reaction temperature.
Figure 2:
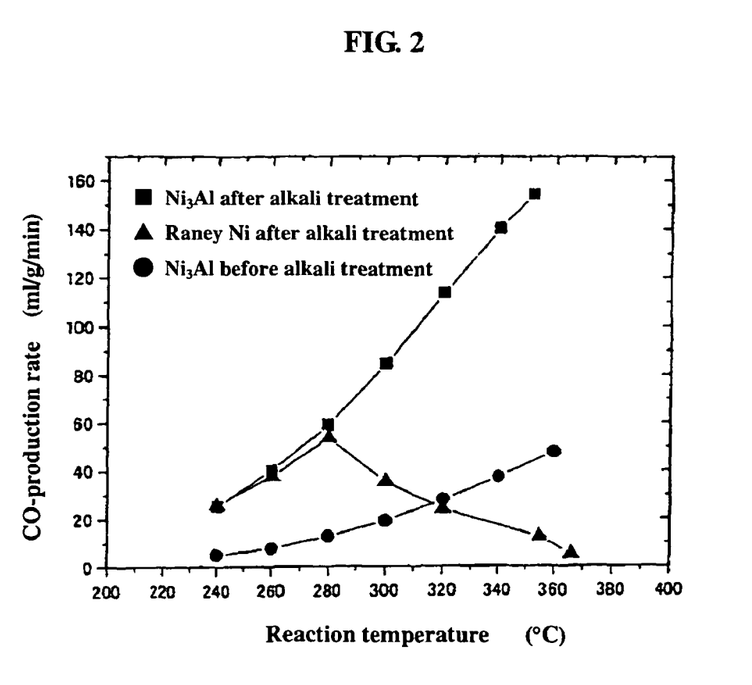
FIG. 2 is a graph showing the CO-production rates (ml/min/g) measured in methanol-reforming reactions by using $Ni_3Al$ and Raney nickel as a function of the reaction temperature.
Figure 3:
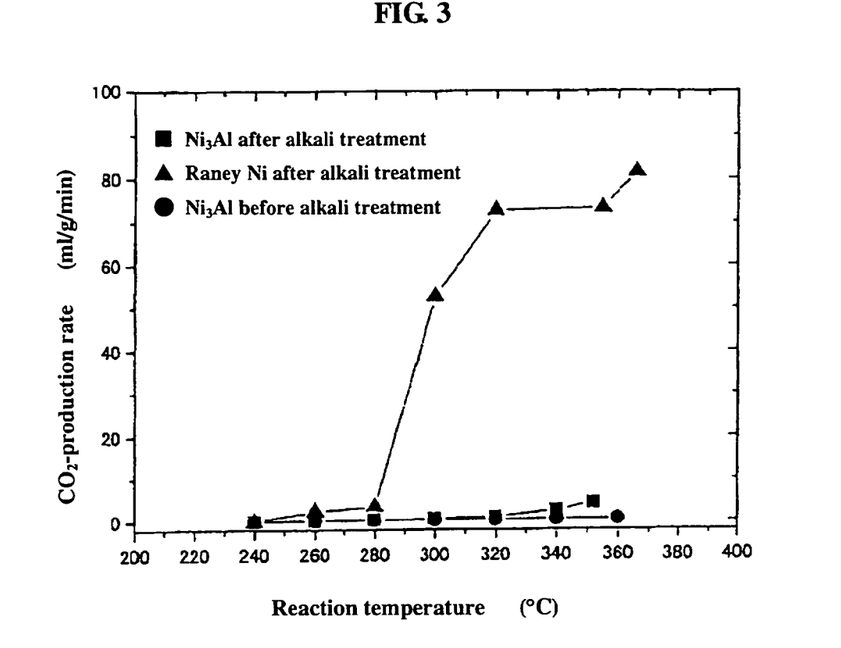
FIG. 3 is a graph showing the $CO_2$ production rates (ml/min/g) measured in methanol-reforming reactions by using $Ni_3Al$ and Raney nickel as a function of the reaction temperature.

0.2 g of the powder sample prepared by mechanical polishing in Example 1(b) above was subjected as catalyst to a hydrogen reduction treatment at 240° C. for 1 hour in a catalytic reactor [fixed bed-flow reactor], and the activity of the powder sample was evaluated under atmospheric pressure at reaction temperatures of 240° C., 260° C., 280° C., 300° C., 320° C., 340° C., and 360° C., by using a liquid mixture of methanol and water (CH$_3$OH:H$_2$O: 1:1.5 (mol)) as the raw material. The results are shown by black circular marks in FIGS. 1 to 3. As shown in FIG. 1, the hydrogen-production rate (ml/min/g) in the reaction increases as the temperature rises, but the rates are lower altogether. FIGS. 2 and 3 respectively show the CO- and CO$_2$-production rates (ml/min/g) at each reaction temperature measured as a function of the reaction temperature. Apparently, the Ni$_3$Al catalyst generated mainly CO, indicating that the Ni$_3$Al catalyst was active in the methanol-decomposing reaction (CH$_3$OH→CO+2H$_2$), namely, in the hydrogen-generating reaction.

Example 3

0.2 g of the catalyst, i.e., the powder sample prepared by mechanical polishing in Example 1(b) above and treated with an aqueous 20% NaOH solution, was subjected to a hydrogen reduction treatment at 240° C. for 1 hour, and the activity of the powder sample was evaluated. The results are shown by black square marks in FIGS. 1 to 3. As apparent from FIG. 1, Ni$_3$Al had a high hydrogen-production rate of 351 ml/min/g at 352° C. In addition, the alkali-treated Ni$_3$Al catalyst had a superior high-temperature activity, showing a further increased hydrogen-production rate as the temperature rose. FIGS. 2 and 3 also show that mainly CO was formed. The results above indicate that the alkali treatment of Ni$_3$Al leads to increase in catalytic activity.

Example 4

Alloys different in composition (Ni-24 at % Al, Ni-22 at % Al, Ni-18 at % Al) were prepared according to the method described in Japanese Patent No. 3374173 by the unidirectional solidification method, and converted by cold-rolling method into foils having a thickness of 30 to 35 μm.

Figure 4:
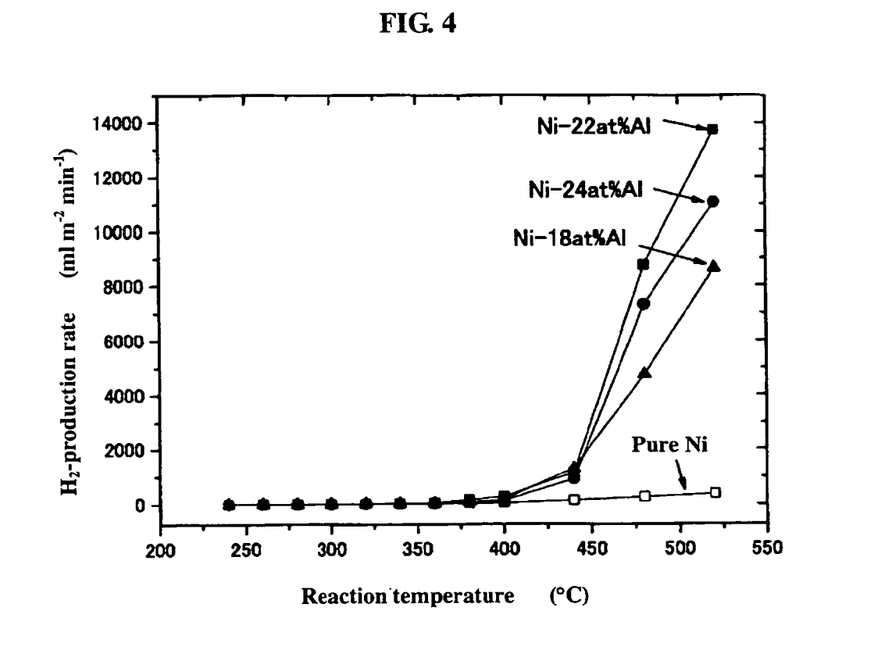
FIG. 4 is a graph showing the $H_2$ production rates (ml·$m^{-2}$·$min^{-1}$) measured in methanol decomposition reactions by using the $Ni_3Al$ foils in various compositions prepared in Example 4 and a commercially available pure Ni foil as a function of the reaction temperature.
Figure 5:
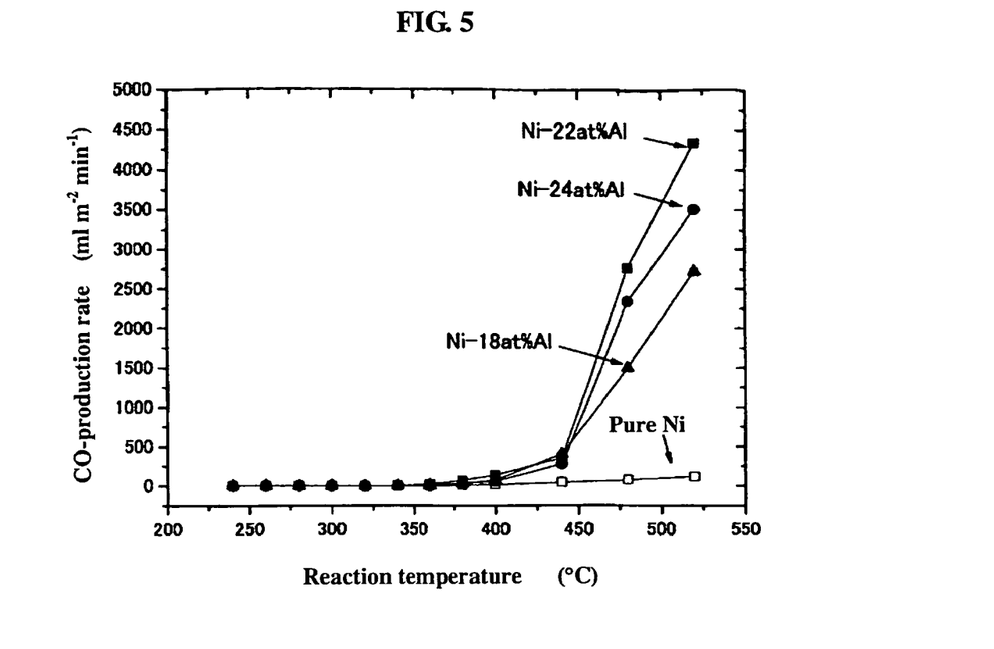
FIG. 5 is a graph showing the CO-production rates (ml·$m^{-2}$·$min^{-1}$) measured in methanol decomposition reactions by using the $Ni_3Al$ foils in various compositions prepared in Example 4 and a commercially available pure Ni foil as a function of the reaction temperature.
Figure 6:
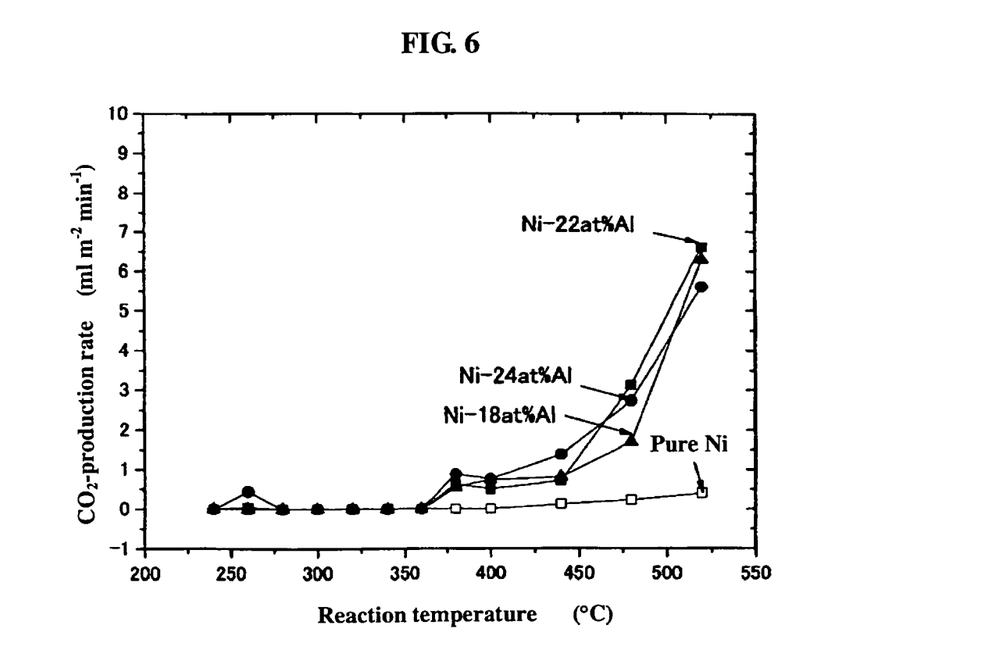
FIG. 6 is a graph showing the $CO_2$-production rates (ml·$m^{-2}$·$min^{-1}$) measured in methanol decomposition reactions by using the $Ni_3Al$ foils in various compositions prepared in Example 4 and a commercially available pure Ni foil as a function of the reaction temperature.
Figure 7:
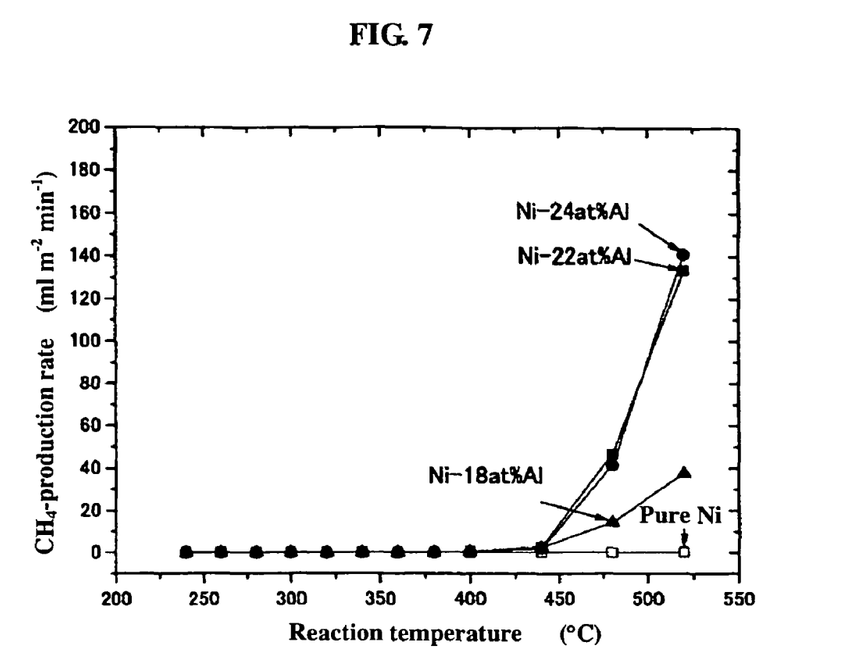
FIG. 7 is a graph showing the $CH_4$-production rates ($ml \cdot m^{-2} \cdot min^{-1}$) measured in methanol decomposition reactions by using the $Ni_3Al$ foils in various compositions prepared in Example 4 and a commercially available pure Ni foil as a function of the reaction temperature.

Each of the foils different in composition was cut without the alkali surface treatment into pieces of 4 mm in width and 220 mm in length, and formed into a spiral cylinder having a diameter of 6 to 7 mm. The cylindrical sample was subjected to a hydrogen reduction treatment in a catalytic reactor (fixed-bed flow reactor) at 240° C. for 1 hour, and then, the catalytic activities thereof were evaluated by using methanol as raw material under atmospheric pressure at 240° C., 260° C., 280° C., 300° C., 320° C., 340° C., 360° C., 400° C., 440° C., 480° C., and 520° C. The results are shown by black triangular marks: (Ni-18 at % Al), black square marks (Ni-22 at % Al), and black circular marks (Ni-24 at % Al) in FIGS. 4 to 7. As shown in FIG. 4, the hydrogen-production rates (ml·m$^{-2}$·min$^{-1}$) (the volume of hydrogen generated per square meter of foil catalyst surface per minute) of the foils in all compositions increase as the temperature rises, when the foil catalysts are heated at a temperature of 400° C. or more. Among them, the foil having a composition of Ni-22 at % Al showed the fastest hydrogen-production rate and the most superior catalytic activity. FIGS. 5 to 7 are the results showing the production rates (ml·m$^{-2}$·min$^{-1}$) of gases other than hydrogen: CO, CO$_2$, and CH$_4$ as a function of the reaction temperature. All of the foils in respective compositions generated CO mainly. The results show that the Ni$_3$Al foils have a catalytic activity for the methanol-decomposing reaction (CH$_3$OH→CO+2H$_2$), i.e., the hydrogen-generating reaction, at a temperature of 400° C. or more, even without alkali surface treatment.

Example 5

Figure 8:
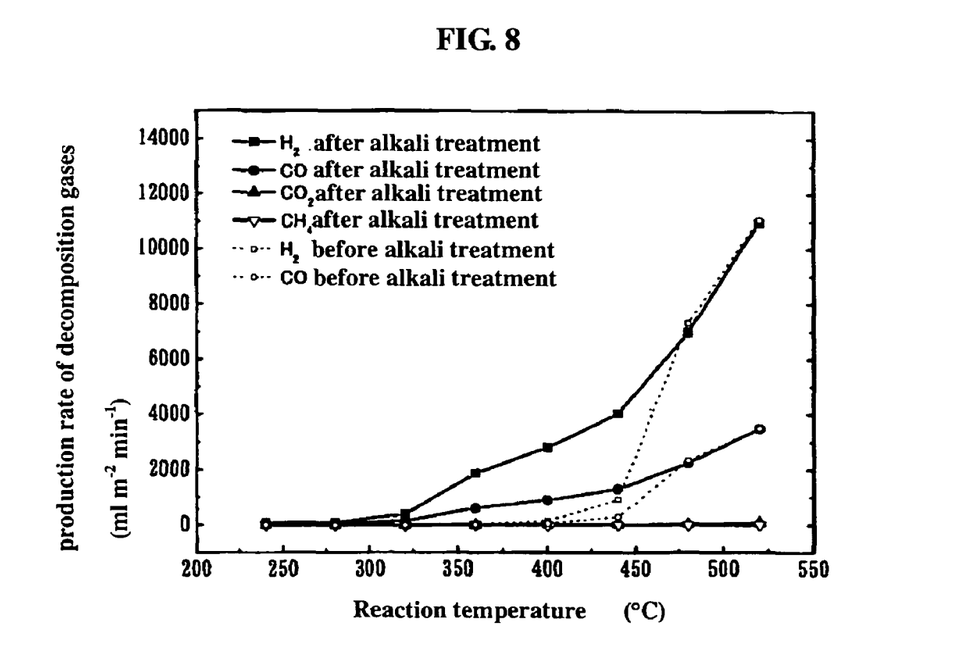
FIG. 8 is a graph showing the production rates ($ml \cdot m^{-2} \cdot min^{-1}$) of $H_2$, CO, $CO_2$, and $CH_4$ (only $H_2$ and CO for the $Ni_3Al$ foil before alkali surface treatment) in methanol decomposition reactions by using an alkali surface-treated $Ni_3Al$ foil (composition: Ni-24 at % Al) and a $Ni_3Al$ foil before alkali surface treatment (composition: Ni-24 at % Al) at the respective measured reaction temperatures, as a function of the reaction temperature.

The foil prepared in Example 4 (composition Ni-24 at % Al) was subjected to an alkali surface treatment in an aqueous 20% NaOH solution at a processing temperature of 90 to 95° C. for 1 hour, and then, the catalytic activity of the foil was evaluated under the same conditions as that of Example 4. FIG. 8 is the results showing the production rates of H$_2$, CO, CO$_2$, and CH$_4$ (ml·m$^{-2}$·min$^{-1}$) at the respective measured reaction temperatures as a function of the reaction temperature. The production rates of H$_2$ and CO of the foil having the same composition before alkali surface treatment are also shown for comparison. The H$_2$- and CO-production rates of the alkali surface-treated foil gradually increased from 320° C., indicating that the foil had a catalytic activity for the methanol-decomposing reaction. The result demonstrated that the alkali surface treatment was effective in lowering the hydrogen-generating reaction temperature.

Example 6

Figure 9:
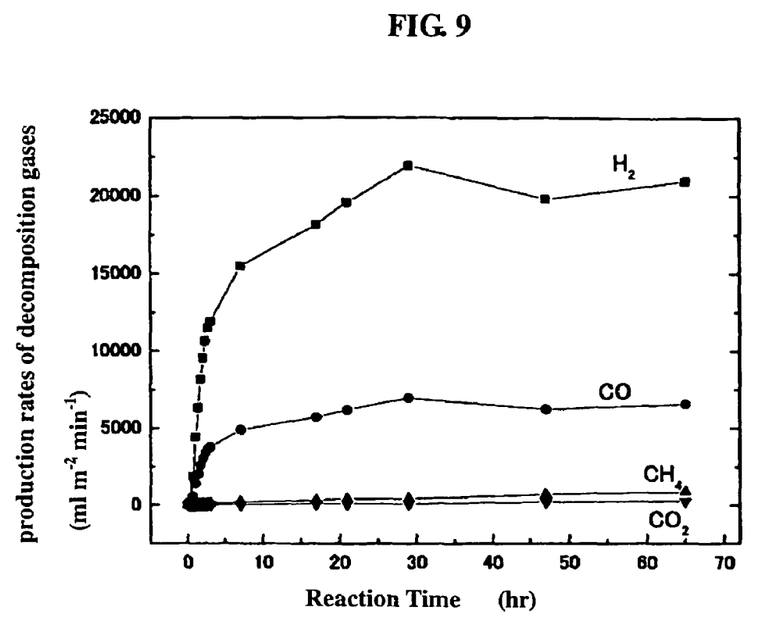
FIG. 9 is a graph showing the production rates of $H_2$, CO, $CO_2$, and $CH_4$ ($ml \cdot m^{-2} \cdot min^{-1}$) measured in methanol decomposition reactions at 520° C. by using the $Ni_3Al$ foil prepared in Example 4 (composition Ni-24 at % Al) as a function of the reaction period.

A methanol decomposition reaction using the foil prepared in Example 4 (composition Ni-24 at % Al) was continued under atmospheric pressure at 520° C. for 65 hours, and the change of the catalytic activity of the foil-shaped Ni$_3$Al over time was measured. FIG. 9 is the result showing the production rates of H$_2$, CO, CO$_2$, and CH$_4$ (ml·m$^{-2}$·min$^{-1}$) as a function of the reaction period, indicating that the H$_2$ production rate did not decrease and the catalytic activity was not lowered in a period of up to 65 hours.

Example 7

Figure 10:
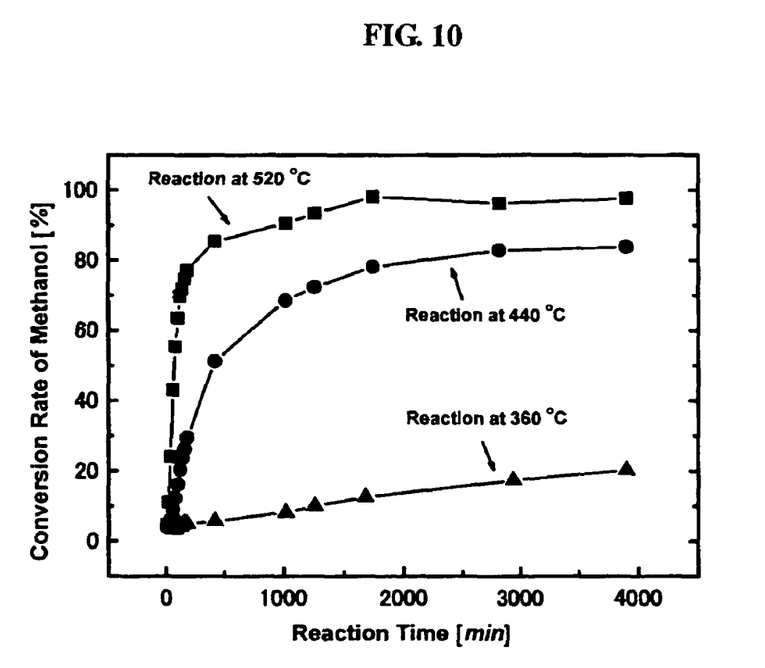
FIG. 10 is a graph showing the methanol conversion rates measured in methanol decomposition reactions at 360° C., 440° C., and 520° C. by using the $Ni_3Al$ foil prepared in Example 4 (composition Ni-24 at % Al)

Change in catalytic activity over time in a methanol decomposition reaction was measured by using the foil prepared in Example 4 (composition Ni-24 at % Al). FIG. 10 is the result showing the methanol conversion rates respectively in the reactions at 360° C., 440° C., and 520° C. The conversion rate is shown to increase as the reaction temperature is raised and the reaction period is elongated. In particular at 520° C., the methanol conversion rate increased suddenly in the early reaction phase as the reaction period was elongated and was stabilized at 95% or more after a particular reaction period.

Figure 11:
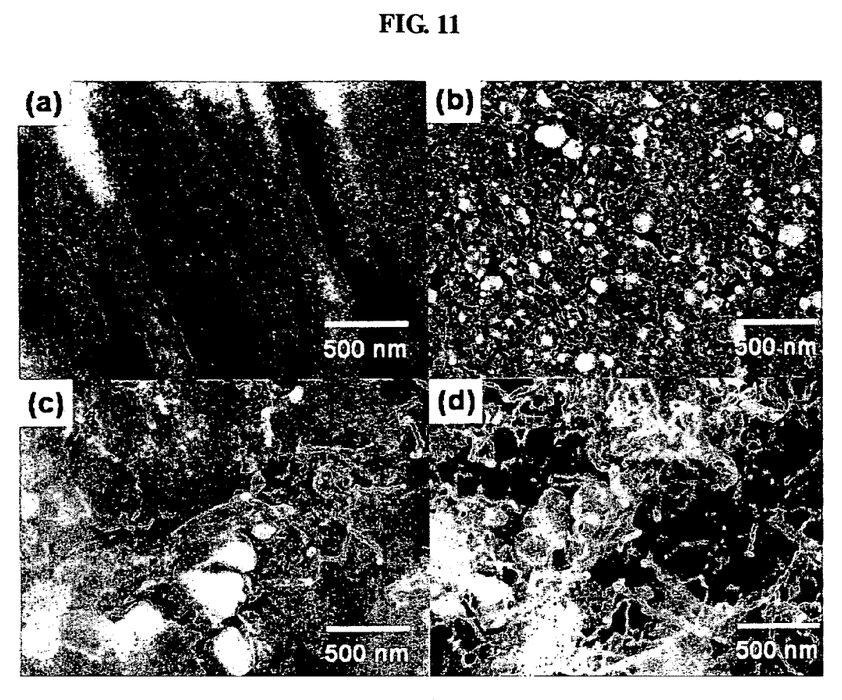
FIG. 11 is SEM micrographs of the surfaces of a foil used in a methanol decomposition reaction at 520° C.: (a) before reaction, (b) after reaction for 1 hour, (c) after reaction for 2 hours, and (d) after reaction for 7 hours.

FIG. 11 is SEM micrographs showing the change of the surface of the foil during the methanol decomposition reaction at 520° C., and (a) shows the surface before reaction; (b), after reaction for 1 hour; (c), after reaction for 2 hours; and (d) after reaction for 7 hours. As shown in these figures, carbon nanofibers containing metal fine particles are gradually deposited after reaction for 2 hours. The structure of the carbon nanofibers containing metal fine particles develops after reaction for 7 hours.

Figure 12:
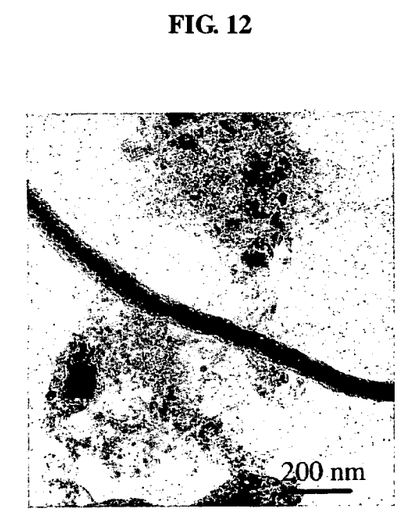
FIG. 12 is a TEM micrograph of the structure of carbon nanofibers containing metal particles formed on the surface after reaction at 520° C. for 7 hours.

FIG. 12 is a TEM micrograph of the structure of the carbon nanofibers containing metal particles deposited on the surface after reaction for 7 hours at 520° C.

Figure 13:
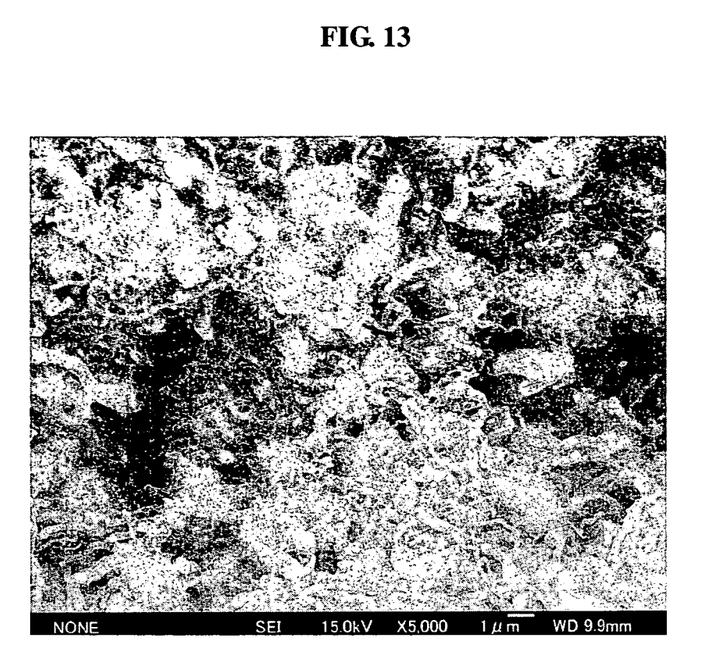
FIG. 13 is a SEM micrograph showing the surface after reaction at 520° C. for 65 hours.

FIG. 13 is a SEM micrograph of the surface structure after reaction for 65 hours at 520° C., indicating that the structure of the carbon nanofibers containing metal fine particles is coarsened.

Example 8

Figure 14:
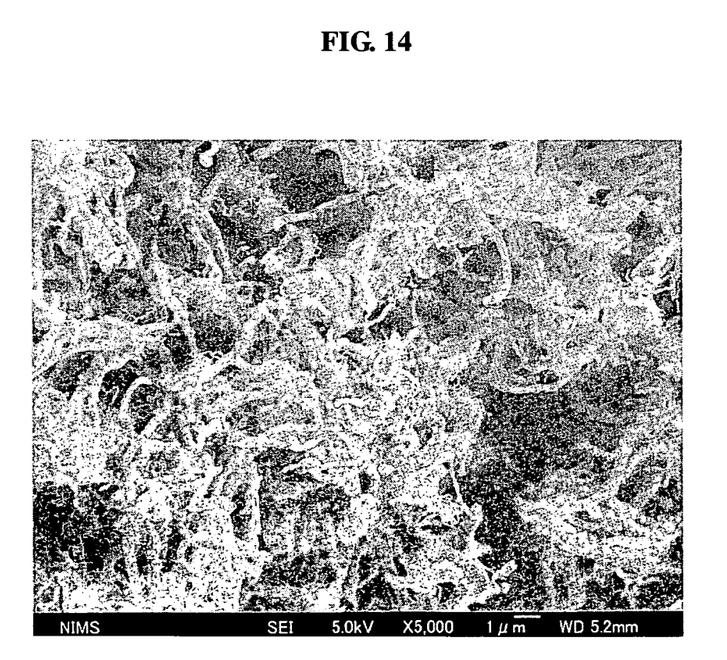
FIG. 14 is a SEM micrograph showing the surface morphology after a methanol decomposition reaction at 440° C. for 65 hours by using the foil prepared in Example 4 (composition Ni-24 at % Al)
Figure 15:
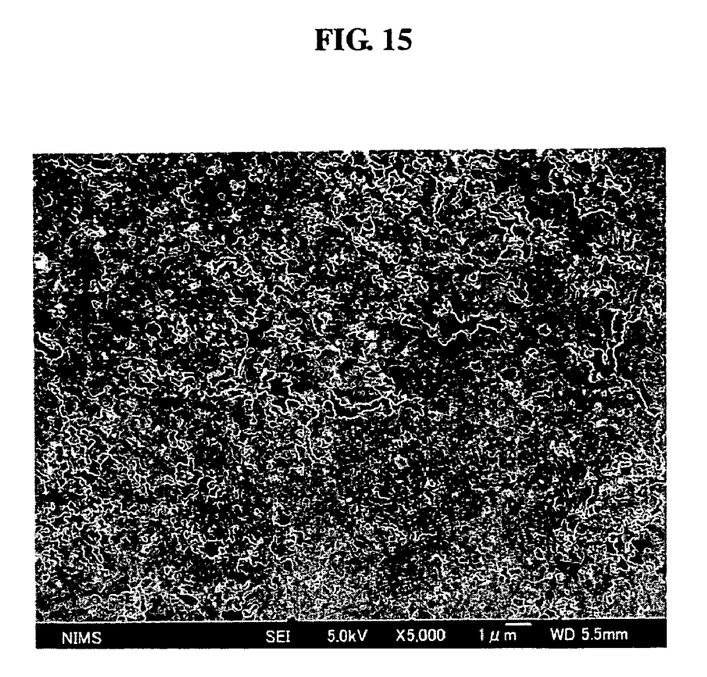
FIG. 15 is a SEM micrograph showing the surface morphology after reaction at 360° C. for 65 hours.

An SEM micrograph of the surface of the foil prepared in Example 4 (composition Ni-24 at % Al) after methanol decomposition reaction at 440° C. for 65 hours is shown in FIG. 14. The micrograph shows a structure of the carbon nanofibers containing metal fine particles deposited on the foil surface. On the other hand, the structure of the carbon nanofibers containing metal fine particles is not deposited on the foil surface after reaction at 360° C. for 65 hours. FIG. 15 shows the SEM micrographic observation.

Example 9

Figure 16:
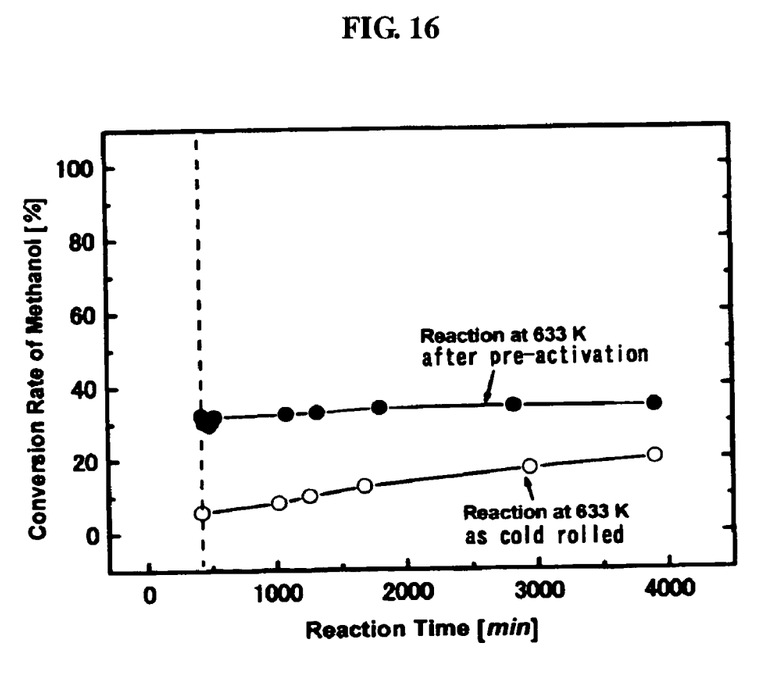
FIG. 16 is graph showing the methanol conversion rates measured in methanol decomposition reactions at 360° C. of the foils prepared in Example 4 (composition Ni-24 at % Al) after catalyst activation treatment (pre-activation) in methanol decomposition reaction at 520° C. for 7 hours.

The foil prepared in Example 4 (composition Ni-24 at % Al) was subjected to a methanol decomposition reaction at 520° C. for 7 hours for activation of the catalyst (pre-activation), and the methanol conversion rate thereof was measured in a methanol decomposition reaction at 360° C. The results are shown by black circular marks in FIG. 16. White circular marks are for the results of the $Ni_3Al$ foil without catalyst activation treatment, and the foil after the catalyst activation treatment had a catalytic activity higher than that of this foil.

In addition, analyses by X-ray diffraction (XRD), X-ray photoelectron spectroscopy (XPS), EDS, and others revealed that the metal particles contained in carbon nanofiber were Ni or $Ni_3Al$.

Figure 17:
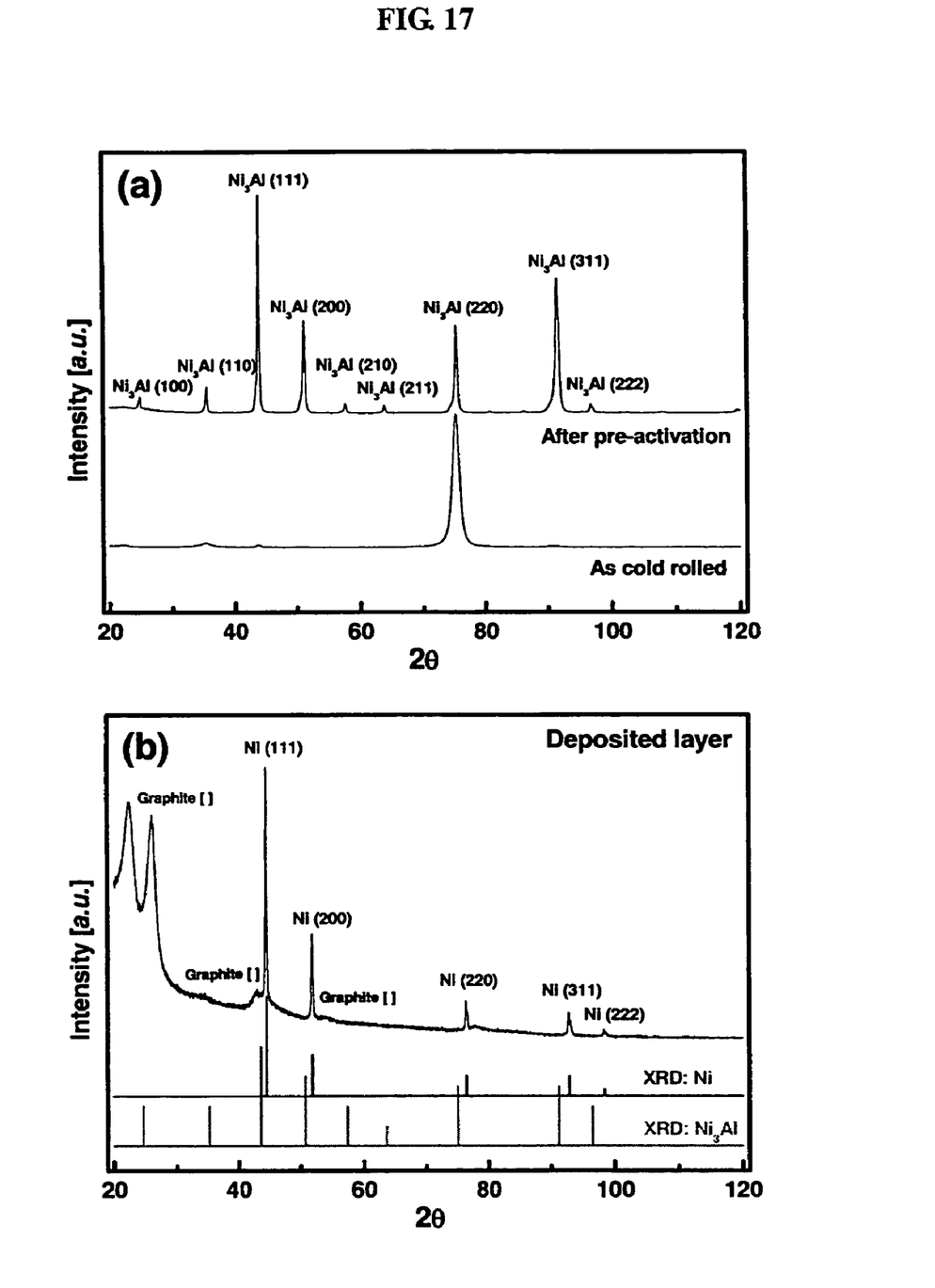
FIG. 17 is a graph showing the results of X-ray diffraction (XRD) analysis of a $Ni_3Al$ foil: (a) XRD results of the entire foils before catalyst activation treatment (as cold rolled) and after catalyst activation treatment (after pre-activation), and (b) XRD results of the porous structure deposited on the foil surface after catalyst activation treatment (after pre-activation)

FIG. 17 shows X-ray diffraction (XRD) analysis results of the $Ni_3Al$ foil: (a) shows the results of the XRD analysis of the entire foils before catalyst activation treatment (as cold rolled) and after catalyst activation treatment (after pre-activation), demonstrating presence of $Ni_3Al$, and (b) shows the XRD results of the porous structure deposited on the foil surface after the catalyst activation treatment (after pre-activation), confirming presence of Ni and C.

Comparative Example 1

A powder of a commercially available Raney nickel (50 wt % Ni-50 wt % Al) was prepared in a similar manner to Examples 1 and 2, and subjected to an activity evaluation test. The results are shown by black triangular marks in FIGS. 1 to 3. As apparent from FIG. 1, the hydrogen-production rate of the Raney nickel catalyst increases at a temperature of 300° C. or less as the temperature rises, but not at a temperature of 300° C. or more.

Comparative Example 2

The catalytic activity of a commercially available pure Ni foil (thickness: 50 μm) was evaluated according to the method similar to that in Example 4. The results are shown by white square marks in FIGS. 4 to 7. As shown in FIG. 4, the hydrogen-production rate of the pure Ni foil was significantly lower than that of a $Ni_3Al$ foil at a reaction temperature of up to 520° C. Also in FIGS. 5 to 7, the production rates of gases other than hydrogen, i.e., CO, $CO_2$, and $CH_4$, were drastically lower than that of the $Ni_3Al$ foil. Concededly, the catalytic activity of $Ni_3Al$ foil is excellent.

Comparative Example 3

Figure 18:
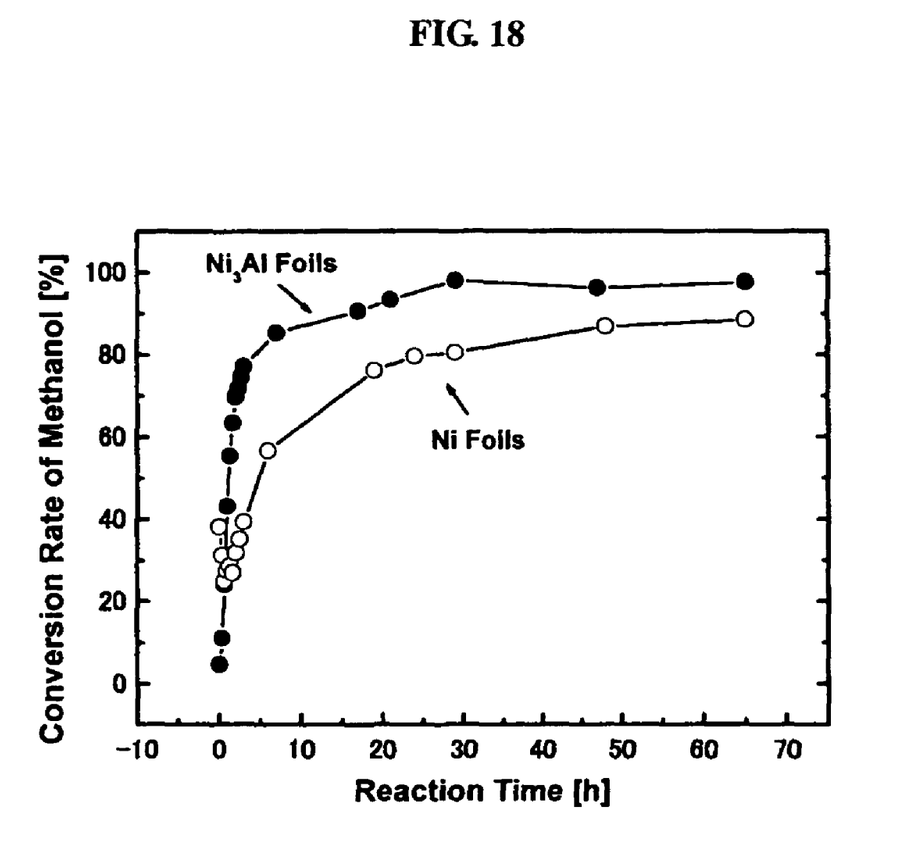
FIG. 18 is a graph showing the methanol conversion rate of a commercially available pure Ni foil (thickness 50 μm) measured in a test for the change in catalytic activity over time at 520° C. according to the method in Example 7.

The change in catalytic activity over time of a commercially available pure Ni foil (thickness: 50 μm) was evaluated by the method similar to that in Example 7 at 520° C. The results are shown by white circular marks in FIG. 18. Black circular marks in the figure indicate the change in catalytic activity over time of the $Ni_3Al$ foil in Example 7 at 520° C. The results demonstrate that the conversion rate of pure Ni foil is significantly lower than that of the $Ni_3Al$ foil.

INDUSTRIAL APPLICABILITY

The present invention provides a methanol-reforming catalyst containing an intermetallic compound $Ni_3Al$ that is superior in activity and selectivity even at a temperature of 350° C. or more in the reaction producing a hydrogen-containing gas from methanol or a mixed liquid of methanol and water as the raw material, which would be applicable to the fuel cell of automobiles, new smaller and high-efficiency high-temperature reactor, and the like and used effectively in industrial applications.

As described above, the first invention in this application provides a methanol-reforming catalyst containing an intermetallic compound $Ni_3Al$ that is superior in activity and selectivity even at a temperature of 350° C. or more in the reaction producing a hydrogen-containing gas from methanol or a mixed liquid of methanol and water as the raw material.

In the second invention, the catalyst may contain other coexistent components in amounts in particular ranges in addition to the intermetallic compound $Ni_3Al$, which allows production and preparation of the catalyst easier and at low cost.

In the third invention, it is possible to produce a powdery or granular catalyst that is more easily applicable to the methanol-reforming reaction by employing more convenient means.

The fourth invention provides a methanol-reforming catalyst that is superior in high-temperature properties, has high catalytic activity and high selectivity even at a high temperature of 400° C. or more, and retains its catalytic activity without deterioration even at a high temperature for an extended period of time.

The fifth and sixth inventions provide a methanol-reforming catalyst having carbon nanofibers containing metal fine particles deposited on the surface of the catalyst and thus having a higher catalytic activity.

In addition, the seventh invention allows improvement in the surface activity of the active ingredient intermetallic compound and modification of the surface shape and composition thereof, consequently leading to improvement in catalytic activity even at a lower temperature.

Further, the eighth and ninth inventions of this application allow efficient hydrogen production because of the highly reactive methanol-reforming reaction when the catalyst is used actually at a high temperature of 350° C. or more.

The invention claimed is:

1. A methanol-reforming method which comprises producing hydrogen by bringing methanol or a liquid mixture of methanol and water into contact with a catalyst comprising an intermetallic compound $Ni_3Al$, characterized by being a powder or granule prepared by machining and mechanically polishing a melt-prepared ingot or in an atomization process.

2. The methanol-reforming method according to claim 1, wherein the contents of Ni and Al are respectively 77 to 95% and 5 to 23% with respect to the total element composition in wt%.

3. The methanol-reforming method according to claim 1, wherein the methanol or the liquid mixture of methanol and water is brought into contact with the catalyst that is previously subjected to a hydrogen reduction treatment.

4. The methanol-reforming method according to claim 1, wherein the methanol or the liquid mixture of methanol and water is brought into contact with the catalyst that is previously alkali or acid treated.

5. A methanol-reforming method which comprises producing hydrogen by bringing methanol or a liquid mixture of methanol and water into contact with a catalyst comprising an intermetallic compound $Ni_3Al$, wherein carbon nanofibers containing metal fine particles are deposited on a surface of the $Ni_3Al$.

6. The methanol-reforming method according to claim 5, wherein the metal fine particles are fine particles of at least one of the metals of Ni and $Ni_3Al$.

7. The methanol-reforming method according to claim 5, wherein the contents of Ni and Al are respectively 77 to 95% and 5 to 23% with respect to the total element composition in wt%.

8. The methanol-reforming method according to claim 5, wherein the methanol or the liquid mixture of methanol and water is brought into contact with the catalyst that is previously subjected to a hydrogen reduction treatment.

9. The methanol-reforming method according to claim 5, wherein the methanol or the liquid mixture of methanol and water is brought into contact with the catalyst that is previously alkali or acid treated.

* * * * *